(12) United States Patent
Grobler et al.

(10) Patent No.: US 7,051,106 B2
(45) Date of Patent: May 23, 2006

(54) SCHEDULING OF CALLS WITH KNOWN HOLDING TIMES

(75) Inventors: Reinette Grobler, New York, NY (US);
David Michael Rouse, Granville, OH (US); Malathi Veeraraghavan, Atlantic Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 852 days.

(21) Appl. No.: 09/820,116

(22) Filed: Mar. 28, 2001

(65) Prior Publication Data

US 2002/0042827 A1    Apr. 11, 2002

Related U.S. Application Data

(60) Provisional application No. 60/225,431, filed on Aug. 15, 2000.

(51) Int. Cl.
*G06F 15/16* (2006.01)
*G06F 15/177* (2006.01)
*G06F 15/173* (2006.01)

(52) U.S. Cl. .................. 709/228; 709/203; 709/205; 709/208; 709/217; 709/218; 709/220; 709/224; 709/225; 709/228; 709/237

(58) Field of Classification Search ................ 370/463, 370/329, 458; 455/452
See application file for complete search history.

(56) References Cited

U.S. PATENT DOCUMENTS

| | | | | |
|---|---|---|---|---|
| 5,870,441 A * | 2/1999 | Cotton et al. | ............... | 375/354 |
| 5,920,571 A * | 7/1999 | Houck et al. | ............... | 370/458 |
| 6,014,694 A * | 1/2000 | Aharoni et al. | ............ | 709/219 |
| 6,094,582 A * | 7/2000 | Zimmermann | ........... | 455/452.2 |
| 6,134,596 A * | 10/2000 | Bolosky et al. | ............ | 709/233 |
| 6,256,669 B1 * | 7/2001 | Hurwitz | ...................... | 709/224 |
| 6,370,154 B1 * | 4/2002 | Wickham | .................... | 370/463 |
| 6,862,618 B1 * | 3/2005 | Gray et al. | ................. | 709/224 |
| 6,947,388 B1 * | 9/2005 | Wagner | ...................... | 370/252 |
| 2001/0055286 A1 * | 12/2001 | Lin et al. | ..................... | 370/329 |
| 2002/0059365 A1 * | 5/2002 | King et al. | ................. | 709/203 |
| 2003/0093458 A1 * | 5/2003 | Poindexter et al. | ......... | 709/201 |

* cited by examiner

*Primary Examiner*—Bunjob Jaroenchonwanit
*Assistant Examiner*—Chad Zhong

(57) ABSTRACT

A method of automatically queuing calls for later transmission in connection-oriented networks instead of blocking them when network resources are unavailable at the time the request is received, as currently done. A simple call queuing method holds up call setup messages at each switch along an end-to-end path of a network until resources become available. This simple, known queuing method suffers from poor network utilization and long call queuing delays. However, if calls that can be queued have known holding times, a call scheduling method that results in reduced call queuing delays and improved network utilization according to the present invention can be realized.

19 Claims, 10 Drawing Sheets

TABLE II
PARAMETERS USED IN SIMULATION OF SCHEDULING SCHEMES

| Parameter (scheme) | Values |
|---|---|
| $F$ ($F$) | 20, 50 and 100 seconds |
| $n$ (*timeslots*) | 2, 3 and 4 |
| $D_{max}$ ($kT_{wait} - T_{max}$) | 100, 150 and 200 seconds |

FIG 6

SCHEDULING OF CALLS WITH KNOWN HOLDING TIMES

CROSS-REFERENCE TO RELATED APPLICATION

This application claims priority of Provisional Application Ser. No. 60/225,431 which was filed Aug. 15, 2000.

TECHNICAL FIELD

This invention relates to scheduling of data communications and more particularly to scheduling data communication calls over a network including one or more switches.

BACKGROUND OF THE INVENTION

High-speed circuit-switched networks, such as Synchronous Optical Networks/Synchronous Digital Hierarchy (SONET/SDH) and Wavelength Division Multiplexed (WDM) networks, are primarily used to provide physical facility or "wire" service in the current Internet and telephone networks. In other words, SONET or WDM lightpath circuits are used to interconnect IP routers, ATM switches or Time Division Multiplexed (TDM) crossconnects. The data rates of these circuits are so high that their direct use is seldom considered for end-to-end applications; packet-level multiplexing as offered by IP or ATM, or DSO level circuits used by data-generating endpoints. Even video applications, which are expected to have the highest bandwidth requirements, require far less bandwidth than provided is by the least-bandwidth SONET circuit of approximately 51 Mbps.

After considering many alternatives, perhaps the only end-to-end applications that could potentially use direct SONET or WDM lightpath (without any multiplexing on it) circuits are file transfer applications for large files. The high data rates of SONET are not the issue, since the higher the rate, the shorter the file transfer delay. Also not an issue is the drawback of circuit-switched networks at handling bursty traffic with file transfer applications, since there is no intrinsic burstiness in communicating a large file from one computer to another. Once a file transfer starts, bits can be sent continuously with no gaps. Thus, it is desirable to provide the usage of end-to-end high-speed circuits for the actual large file transfers. The related requests-for-files and other supporting communications required by every file-transfer application may use an associated connectionless network, such as an IP network, for support of data transfers. Furthermore, the SONET bandwidth granularity issue is not a problem for a file-transfer application, since a file transfer may occur at any rate and any granularity.

It is known from an analysis in a paper by Miyahara et al entitled "A comparative evaluation of switching methods in computer communication networks," appearing in Proc. of IEEE, ICC, San Francisco, June 1975, pp. 6–10; that for large file transfers, circuit switched networks provide lower delays and higher throughputs than connectionless packet-switched networks. A similar analysis is known from Schwartz's book *Telecommunication networks*, by Addison-Wesley Publishing Company, 1988; and also from McDonald's book *Fundamentals of digital switching*, by Plenum Press, 1983. The reason for such results is that while circuit-switched networks suffer from the overhead of initial call setup, once the circuit is established, per-packet overhead, acknowledgment overhead and queuing delays, are not incurred as they are in packet-switched networks. Additionally, in connectionless networks, packet loss due to buffer overflows may cause congestion control schemes, such as TCP's slow start, to drop data rates, further affecting the total file transfer delay. However, in circuit-switched networks, besides call processing delays, an additional delay is incurred at the start as a call waits for resources to become available if all resources are in use when the call arrives. This is in contrast to connectionless packet-switched networks in which all calls (for example new file transfer sessions) are admitted and packets compete for the network resources. In circuit-switched networks, a call is assigned a dedicated resource for the whole duration of the call and other calls wait in line until resources become available for their file transfers.

In Miyahara et al's paper mentioned above, the delay associated with waiting for resources, which is here after referred to as "call queuing" delay, is characterized as $kT_{wait}$, where k is the number of the switches on an end-to-end path and $T_{wait}$ is the average waiting time for resources at each switch. In such a scheme, a call setup message is held up at each switch sequentially along an end-to-end path until resources become available at each switch. There are two problems with this simple scheme. First, the total queuing delay incurred waiting for network resources can become rather large due to the sequential waiting period at each switch on the end-to-end path. Second, while call queuing schemes in general improve bandwidth utilization over call blocking schemes, the $kT_{wait}$ scheme will not achieve the improvement that is possible. The reason an improvement in bandwidth utilization can be expected in call queuing schemes is that by having buffers to queue calls, less bandwidth is needed than for a strictly call blocking scheme. The reason why the $kT_{wait}$ scheme does not take advantage of this improvement is that upstream switches hold resources while waiting for downstream switches to admit a call instead of utilizing the wait period to admit shorter calls that only traverse upstream segments.

To overcome these two problems of the simple wait scheme, improvements to the simple call queuing scheme were desired. This led to a queuing scheme where the switches agreed upon a delayed start time for a given call c, and allowed other calls sharing segments of the end-to-end path of call c to use the network resources for other calls before call c started. This decreased call queuing delays and allowed for the utilization gains of call queuing to be realized. However, scheduling calls for a delayed start time with mutual agreement at all the switches on the end-to-end path was only possible if the call holding times were known. A switch cannot guarantee that resources will be available for a new call c at some later point in time if the switch does not know when existing calls will be completed. However, as it turns out, call holding time for large file transfers on circuit-switched networks can be determined a priori if the file sizes, the data rates of the circuit, and propagation delays are either known or can be quickly determined by calculation. Hence, it is desirable to provide an improved call queuing/scheduling problem for calls with known holding times through a network having one or more switches.

Data transfers with known holding times are those that satisfy two properties: (i) the sending end of the data transfer is from a "stored" source rather than a "live" source, and (ii) the network supporting the data transfer uses a preventive congestion control scheme rather than a reactive scheme. Examples include large file transfers on circuit-switched networks and video-on-demand movie transfers on packet-switched connection-oriented networks with preventive congestion control, such as ATM variable bit rate service.

Connection-oriented (CO) networks have been either circuit-switched or packet-switched. In a CO network, connection setup and release procedures, along with the associated message exchanges, constitute the signaling protocol. In circuit-switched telephony networks, the signaling protocols used to set up and release 64 Kbps (DS0) circuits are Q.931, as described in ITU-T, "ISDN user-network interface layer 3 specification for basic call control," Recommendation Q.931, May 1998; and ISDN user part, as described in ITU-T, "Signalling system no. 7-ISDN user part functional description," Recommendation Q.761, December 1999. Signaling protocols have also been used in packet-switched connection-oriented networks, such as X.25 and ATM networks. The User Network Interface (UNI) signaling protocol, as described in The ATM Forum Technical Committee, "Uni signaling 4.0," af-sig-0061.000, July 1996; and Private Network-to-Network Interface (PNNI) signaling protocol, as described in The ATM Forum Technical Committee, "Private network-network specification interface v1.0f (pnni1.0)," af-pnni-0055.000, March 1996; have been used to set up and release virtual circuits in ATM networks. Signaling protocols for IP networks are a more recent development, given that connectionless IP networks have now been augmented with connection-oriented capabilities. Examples include the Resource reSerVation Protocol (RSVP) as described in R. Braden, L. Zhang, S. Berson, S. Herzog, and S. Jamin, "Resource reservation protocol (RSVP) version 1 functional specification," RFC 2205, IETF, September 1997; YESSIR as described in P. Pan and H. Schulzrinne, "YESSIR: A simple reservation mechanism for the internet," Research Report, RC 20967, IBM, September 1997; Label Distribution Protocol (LDP) as described in L. Anderson, P. Doolan, N. Feldman, A. Fredette, and B. Thomas, "LDP specification," Internet Draft, IETF, January 1999. and previous other protocols. However, none of these signaling protocols define procedures for setting up connections using knowledge of connection holding time(s).

There are two characteristics that are needed for calls to have known holding times: a sending end of the call should be "stored," as opposed to "live," and a connection oriented network should use preventive rather than reactive congestion control.

TABLE I

| | Referring to TABLE I, DESTINATION END | |
|---|---|---|
| SENDING END | LIVE | STORED |
| LIVE | Interactive/ Live Streaming | Recording |
| STORED | Stored Streaming | File Transfers | consider the first mentioned characteristic. Table I shows that the sending end and destination end of any data transfer can each be "live" or "stored." If both ends are live and the communication is bidirectional, they are classified as interactive. An example of this category is human telephony, where the call holding time is unknown. Given that both ends are "live" and both ends can send traffic, the call might have a holding time for any length. If both ends are live, but the communication is unidirectional, this case is referred to as a live streaming data transfer. An example is listening to/viewing a live radio/TV broadcast. The next category shown in Table I is recording, where the source is live, but the destination is a stored data device. In both the live streaming and recording categories, the call holding time may or may not be known depending on the duration of the live "event." For e.g., the duration of coverage of a live parade could be known a priori and advertised by the audio/video distributor; on the other hand, the duration of a sporting event, for e.g., a tennis match, is not known beforehand. Therefore, in general it is assumed that if the sending end is "live," the call holding time is unknown.

However, if the sending end is "stored," call holding times are known if the network is used with preventive congestion control (rather than reactive). For e.g., transferring a stored file from a source to a receiver where it is also stored for later consumption (classified as file transfers in Table I) on a TCP/IP network results in an unknown holding time since this network uses reactive congestion control. On the other hand, if the same file is transferred on a circuit established through a circuit-switched network, the holding time can be determined from the file size, the data rate of the circuit, and propagation delays. Similarly, applications in which stored audio or video clips (for e.g., in a web-based class lecture or Video on Demand (VOD)) are consumed live (for e.g., by a student listening) are classified as stored streaming in Table I. If such data is sent on a packet-switched connection oriented network (to take advantage of silences, packet-switched networks are better for this class of applications), and the network supports preventive congestion control, then the call holding time is known. For example, if an ATM Variable Bit Rate (VBR) connection is used rather than an Available Bit Rate (ABR) connection, the call holding time can be predicted given the exact traffic characterization of the stored audio or video file.

Thus, there are a number of applications, which when used on certain types of networks, have deterministic and known call holding times. There is a need in the art to provide methods and systems to make a data call over a connection oriented network when the holding time of the data call is known.

SUMMARY OF THE INVENTION

Briefly stated, in accordance with one aspect of the present invention the aforementioned problems of lack of procedures for setting up connections using known holding times are addressed and an advance in the art is achieved by providing a call scheduling method for a network having one or more switches when call holding times are known. This method is useful for providing support for end-to-end large file transfers on high-speed circuit-switched networks. This method for a data call from a host to a destination over a network includes the steps of sending a setup message including a holding time of the data call from the host to a switch connected to the network; responsive to the setup message, determining at the switch if a channel is available and when the channel is available for making the data call from the host to the destination; responsive to the channel being available, the switch sending a success message to the host identifying the available channel and a start time for making the data call; and responsive to receiving the success message, the host making the data call to the destination via the available channel at the starting time.

In accordance with another aspect of the invention the aforementioned problems of lack of equipment for setting up connections using known connection holding times are addressed and an advance in the art is achieved by providing an apparatus for completing a data call with a holding time from a host to a destination over a network having a plurality of switches. The apparatus includes: a first switch of the plurality of switches connected to the host and having means for receiving a setup message from the host for setting up a channel to the destination for a data call having the holding time; the first switch having means for determining from the setup message and local information of the first switch if a channel of a plurality of channels is available through the first switch to a subsequent switch of the plurality of switches and what times each available channel is available to make the data call in response to receiving the setup message; and the first switch also having means for sending a subsequent setup message including the available channels and the available times for the channels for the data call to a subsequent switch of the plurality of switches between the host and the destination. The subsequent switch has means for determining from the subsequent setup message and local information of the subsequent switch if a channel of a plurality of channels is available through the first switch and the subsequent switch and what times each available channel is available to make the data call. The subsequent switch also has means for sending another setup message including the available channels and the available times for the channels for the data call of the first and subsequent switches to a terminating switch of the plurality of switches that is connected to the destination responsive to the subsequent switch determining means. The terminating switch has means for determining from the setup message and local information of the terminating switch if a channel of a plurality of channels is available through the first and subsequent switches and what times each available channel is available to make the data call to the destination. The terminating switch has means for sending a success message to the host identifying the channel and the time when the channel is available to make the data call if a channel is available for the data call for the holding time via the switches between the host and the destination.

BRIEF DESCRIPTION OF THE DRAWINGS

FIG. 6 is a table showing simulation results.

DETAILED DESCRIPTION

Figure 1:
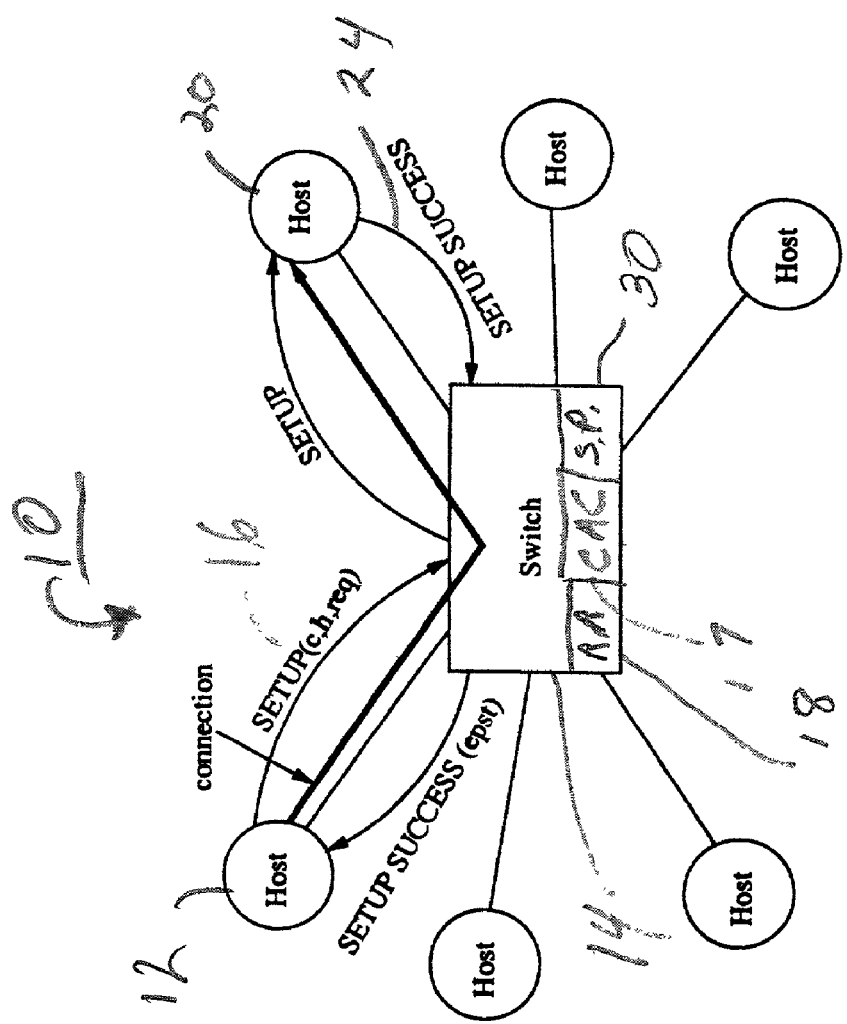
FIG. 1 is a block diagram of a one switch network for practicing the invention.

FIG. 1 shows a one switch network 10, which is useful for practicing one embodiment of the present invention. Consider an improved call scheduling algorithm for call scheduling taking into account holding times as applied to one-switch connections in the one switch network 10. The one switch case permits a description and analysis of a delayed start concept. Afterwards, description and analysis of the one switch case will be expanded to a multiple-switch case, shown later with regard to FIG. 5.

In FIG. 1, calls are generated by one end host 12 to another end host 20 with a given desired capacity (c), a known holding time (h) and a requested start time (req), which typically would be "now" or "immediately." The desired values for c, h, and req are in a setup message 16. A successful connection setup, when both of the end hosts 12, 20 are connected to the same switch 14 is shown in FIG. 1.

The Connection Admission Control (CAC) unit 17 of the switch 14 keeps a time-variant available capacity $a_i(t)$ function for each outgoing interface i reflecting the scheduled start times of all admitted connections. Based on the destination of the connection a set of candidate outgoing interfaces (I) is selected by the routing module. Next, based on the desired capacity (c), holding time (h) and start time (req) for the connection, the earliest possible start time (epst) is determined by the CAC unit 17 using the relation:

find smallest epst and interface i such that, $$epst \geq req \text{ and } a_i(t) \geq c, \; epst \leq t \leq epst+h \text{ for any } i \in I$$

This concept of epst allows for scheduling a call with a delayed start. The time-varying available capacity function for the chosen interface i is updated using the relation:

$$a_i(t) \leq a_i(t)-c, \text{ for } epst \leq t \leq epst+h$$

to reflect the newly admitted connection. The connection request req is then passed on to the destination (host 20) indicating a connection with holding time h, requested capacity c, and start time epst.

If the destination (host 20) accepts the connection, the destination sends a success message 24 back to the switch 14. The switch 14 responds to the connection request with an earliest possible start time at which the end host 12 that requested the connection may start transmission. At this point the connection is "admitted" (not yet "active") at switch 14; the response causes resource reservation table 18 to indicate the capacity and channel reserved. A switch programming unit 30 programs the fabric of switch 14 when the connection's scheduled time arrives, at which time the connection becomes "active" and the end host 12 may start data transmission.

Given the results for the one switch embodiment of FIG. 1, the results and nomenclature can be expanded to a multiple switch embodiment. A problem that arises when connections pass through multiple switches, however; is that the switches may not compute the same value for epst due to the differences in their current states.

Figure 2:
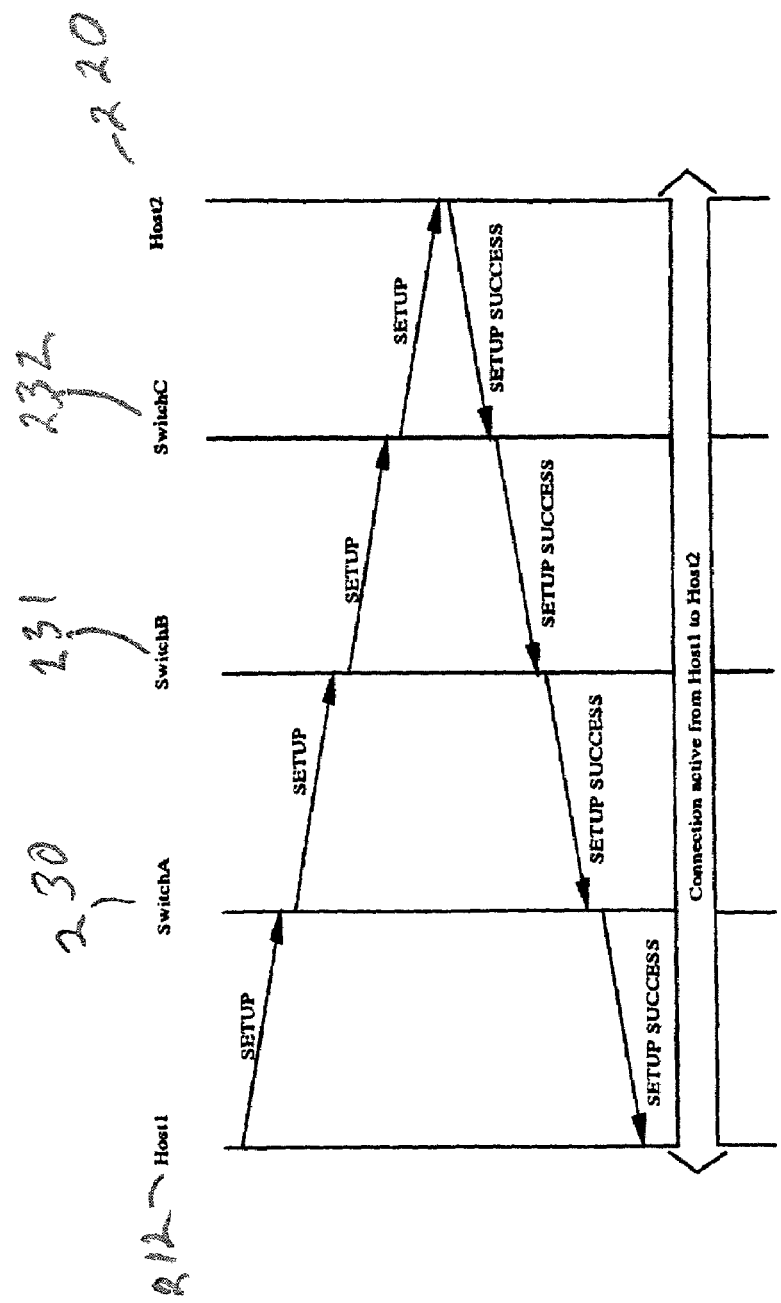
FIG. 2 is a call flow diagram showing a successful setup of a connection in a multiple switch network.

To examine this, consider that the example shown in FIG. 2 is used, where Host 1-212 requests a connection to Host 2-220. The connection is shown in FIG. 2 to traverse through three switches 230, 231 and 232. Assume the first switch, Switch A-230 schedules the connection and reserves resources for some time [$epst_A$, $epst_A+h$], where h is the holding time and $epst_A$ is the earliest possible start time that the connection can be scheduled at Switch A-230. Switch A-230 needs to pass the appropriate information to the next hop switch, Switch B-231, to prevent the latter from scheduling the connection for any $t<epst_A$. Assume Switch B-231 finds that it cannot schedule the connection for $epst_A$, instead its epst is $epst_B$ where $epst_B > epst_A$. Switch A-230 may not have resources available for this connection in the time interval [$epst_B$, $epst_B+h$]. This later starting time could have been allocated earlier to some other connection at Switch A-230. This is a distributed computing problem caused by needing cooperative actions at multiple switches.

Here are two alternative solutions to this problem:
1. The "F method"
2. The "timeslots method"

In the F method, the ingress switch selects an earliest possible start time (epst) for the connection such that is has resources available for the connection from epst to epst+h+F, where h is the holding time of the call and F is some large time value. This large time value holds the resources for this connection for this large time period hoping that the downstream switches will select an epst within this large time period. If a large enough value of F is selected, the probability of success will be high. In the timeslots method, the ingress switch selects multiple time ranges during which it can accommodate the call. Each downstream switch checks to see if it has available resources for one or more of these time ranges. Each switch along the path may narrow the time ranges until finally there exists at least one common time range (of length equal to the call holding time, h) during which the required resources are available at all switches.

To assist understanding, consider an analogy between these scheduling methods and the scheduling of a meeting involving several people. With the meeting duration known to everyone involved, one way to schedule its start is for a first person to send out a memo stating that he/she has "the whole of next week" available. Another solution is for the memo to read, "I am free from 2 pm to 4 pm Monday, 8 am to 1 pm Tuesday, and the whole of the following week." Tentatively, the sender of the memo holds these time ranges for this meeting until a response arrives from all other participants. The first solution corresponds to what is called the F method and the second solution corresponds to what is called the timeslots method.

Both these methods are call queuing methods in that calls wait for resources, but they also block calls if the selected F value or number of time ranges is not large enough for success. Both of these methods can be augmented with negotiations (i.e., multiple signaling exchanges on the same path), and/or searches on multiple paths to reduce call blocking probability.

The F Method

In the forward phase of a connection setup, resources are held for a long enough time period (longer than the holding time of the connection, h) such that if a downstream switch selects a later value for epst, there is some guarantee that the upstream switches of the path will have the resources available. Upon receipt of a connection request, the ingress switch selects an epst and a large F such that starting with the epst it is able to accommodate the connection until epst+h+F. It then passes on the connection request to the next hop switch with this epst and F, and also h. Upon receipt of the request, an intermediate switch searches for the largest period inside the range (epst, epst+h+F) during which the intermediate switch can accommodate the connection. As the success reply message traverses the network in the reverse direction, the reservation period is reduced to the requested holding time of the connection.

The epst value is computed as follows. When a host requests a connection to destination d from time req with capacity c, holding time h, and I is the set of interfaces selected by the routing module, a relation to find the smallest epst and interface i such that:

$$epst \geq req \text{ and } a_i(t) \geq c, \; epst \leq t \leq epst+h+F \text{ for any } i \in I.$$

This relation can be used at the ingress switch to compute epst. The time-varying available capacity function for the chosen interface is updated using:

$$a_i(t) \leq a_i(t)-c, \text{ for } epst \leq t \leq T_{end}.$$

in which $T_{end}=epst+h+F$.

The setup request traverses the network with each switch along the path computing a (possibly) new value for epst and looking for the largest time period $\leq F$ but $\geq h$, during which it will have enough resources available. If found, the requested resources are reserved for this connection (using the assignment in the previous paragraph) for the period ($epst_{new}$, $epst_{new}+h+F_{new}$), and the connection request containing $epst_{new}$, $F_{new}$, h and h are passed on to the next hop. If a switch is unable to find a time period during which it can accommodate the connection, the call is blocked and release procedures are initiated. If the destination host accepts the request for a connection from the source, the final value of epst is passed from switch to switch until the source is notified of the new value of epst.

As these success reply messages traverse the network to the source, all the switches change their resource reservation tables to reflect the new start time (the new value of epst), and the finish time to be epst+h. If $epst_{local}$ indicates the earliest possible start time as computed by a switch in the forward direction of the signaling procedure, and epst is the earliest possible start time it received in the success reply message, the time-varying available capacity function is updated using:

$$a_i(t) \leq a_i(t)+c, \text{ for } epst_{local} \leq t < epst$$

$$a_i(t) \leq a_i(t)+c, \text{ for } epst+h \leq t < T_{end}$$

Choosing a large value for F will increase the probability that downstream switches will find an available time range within the one provided by the ingress switch, resulting in a low blocking probability. The disadvantage of a large value for F is that the ingress switch might have resources available for the connection during time ranges that is smaller than F, but large enough to handle the connection. These time ranges will be ignored by this particular scheme, which will result in low utilization of the channels between switches. For example, FIG. 3 describes the available bandwidth function for an OC1 interface if the current time is 2 pm. Consider an F value of four hours. When a connection that has to be handled by this interface arrives, requesting an immediate start time and indicating a holding time of one hour, the earliest time this interface will be able to handle the connection will be at 10 pm, even though resources are available from 3 pm until 5 pm and from 8 pm to 9 pm.

The Timeslots Method

An improvement to the F method that will solve the problem with utilization, without increasing the call blocking probability significantly, is the usage of several time ranges. In this method the ingress switch selects a number n of time ranges during which it has the resources required for the new call. A time range j is identified by a start time $t_{js}$ that is equal to or larger than the requested time (req) and the end time $t_{je}$ is larger or equal to $t_{js}+h$, during which the switch has resources available to handle the connection. If I is the set of interfaces selected by the routing module as described previously, the ingress switch selects n different time ranges by using:

Find n time ranges such that, $t_{1s} \geq \text{req}$, $t_{1s} < t_{1e} < t_{2s} < t_{2e} < t_{3s} < t_{3e} < \ldots < t_{ns} < t_{ne}$, $t_{je} - t_{js} \geq h$, $\forall j$, $1 \leq j \leq n$, and $a_i(t) \geq c$, $t_{js} \leq t \leq t_{je}$, $\forall j$, $1 \leq j \leq n$ for any i ∈I.

Upon finding n time ranges, $(t_{1s}, t_{1e})$, $(t_{2s}, t_{2e})$, ..., $(t_{ns}, t_{ne})$, the required resources are reserved using:

$a_i(t) \leq a_i(t) - c$, for $t_{js} \leq t \leq t_{je}$, for $1 \leq j \leq n$ The n time ranges are sent in the connection setup message to the next switch along with the holding time h. On receipt of a connection request containing time ranges, an intermediate switch attempts to admit the call during each of the time ranges or any part of each range greater than or equal to the holding time. The matching time ranges are passed on to the succeeding switch. If no matching time range is found, the call is blocked and connection release procedures are initiated to release tentatively reserved resources.

Figure 3:
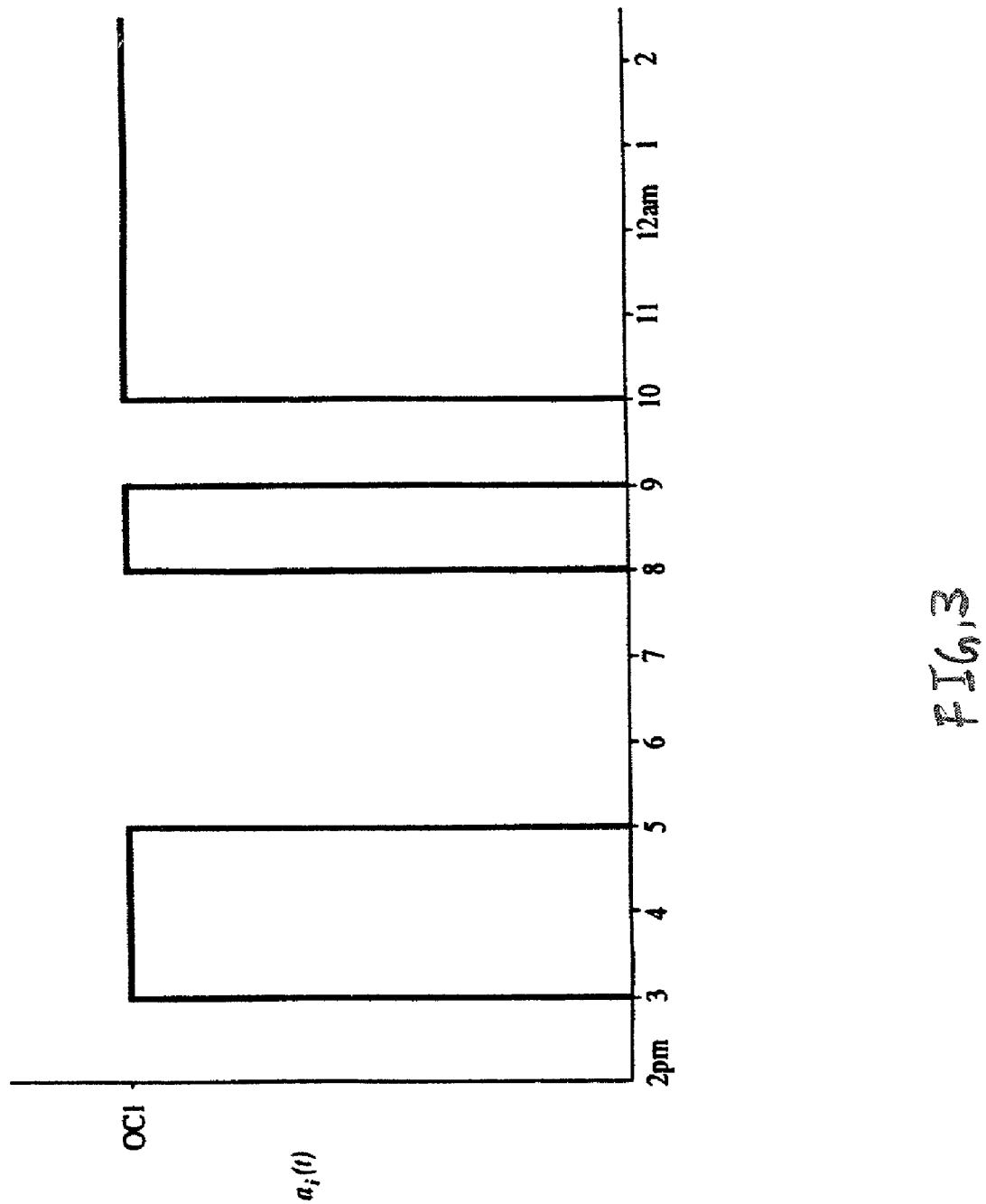
FIG. 3 is a plot of available bandwidth versus time for one switch of the network represented by FIG. 2.
Figure 4:
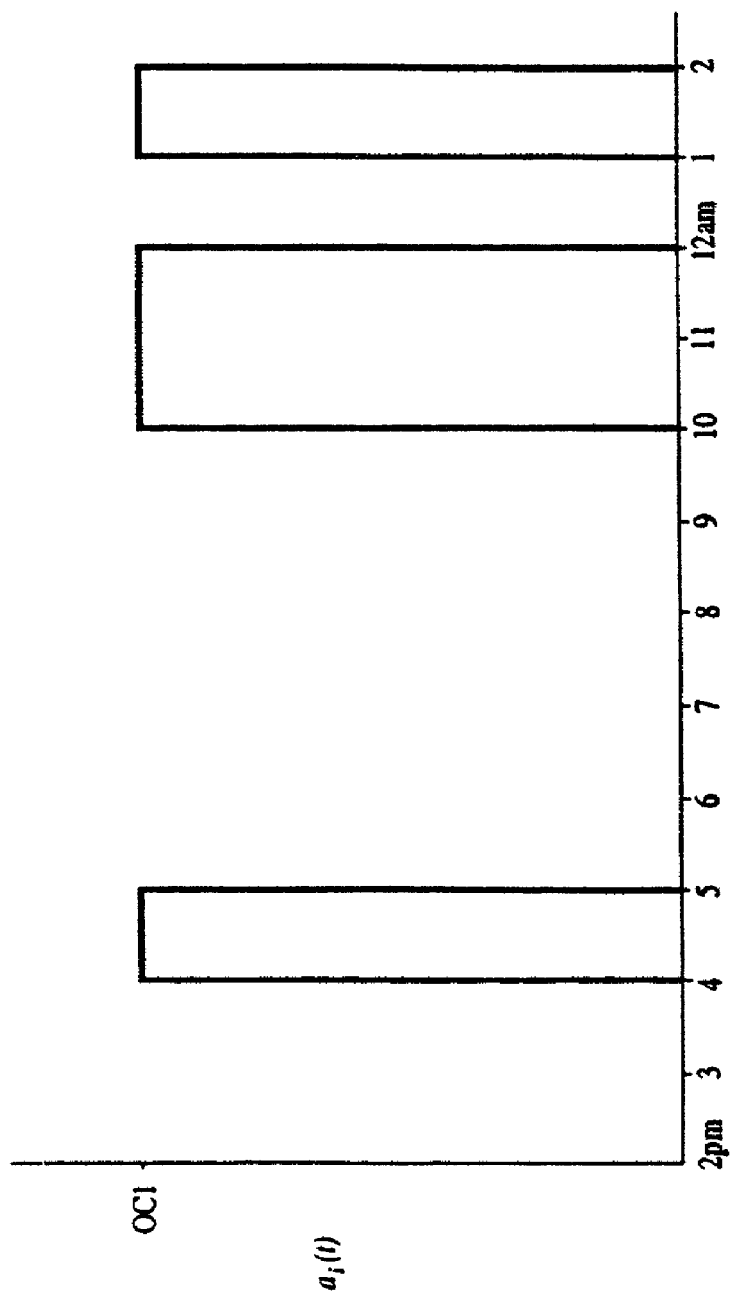
FIG. 4 is a plot of available bandwidth versus time for a subsequent switch of the network represented by FIG. 2.

As an example, consider the available bandwidth function of an OC1 interface of Switch1 shown in FIG. 3. If a connection request arrives requesting an immediate start time for an OC1 circuit lasting one hour, the timeslots method will cause Switch 1 to pass the connection request to the succeeding switch containing the time ranges [3 pm, 5 pm], [8 pm, 9 pm] and [10 pm, ∞] in the case when n=3. FIG. 4 shows the available bandwidth function of Switch 2 before it received the connection request. On receipt of the connection request, Switch 2 determines that it can admit the call during the time ranges [4 pm, 5 pm], [10 pm, 12 am] and [1 am, 2 am]. The new time ranges are then passed to the succeeding switch. The ranges could be very small (in the order of milliseconds) when connections are used for file transfers, or large (in the order of hours) for video on demand connections.

If after passing through all switches on the end-to-end path a time range greater than the holding time is found, the destination is offered the call. If the destination accepts, it creates a success message with the start time of the earliest time range in the connection request it received (epst). As this message traverses the network each switch releases reserved resources during the unselected time ranges as shown by:

For $1 \leq j \leq n$

If $t_{js} \leq \text{epst} \leq t_{je}$, then $a_i(t) \leq a_i(t) + c$ for $t_{js} \leq t < \text{epst}$ and $a_i(t) \leq a_i(t) + c$ for $\text{epst} + h < t \leq t_{je}$ else $a_i(t) \leq a_i(t) + c$, for $t_{js} \leq t \leq t_{je}$ In the above description, it was assumed that the number of time ranges sent from each switch was n, a constant. However, it is feasible to allow intermediate switches to create more time ranges than the number n of time ranges selected by the ingress switch. This could happen if resources were not available at an intermediate switch for the whole duration of a time range selected by the ingress switch, but instead parts of the time range had available resources at that intermediate switch. Also, the number of time ranges selected at an intermediate switch could be fewer than n if it does not have the resources available during some of the time ranges.

Simulation and Results

In a simulation, the F method and the timeslots method were compared against each other, as well as against the $kT_{wait}$ scheme assumed in the article by Miyahara et al mentioned in the Background. As described in the Background, the $kT_{wait}$ scheme is a simple call queuing scheme in which the call request is queued at each switch sequentially along the end-to-end path until resources become available. Infinite buffers are assumed in order to hold call requests, which makes the $kT_{wait}$ scheme non-blocking. In contrast, both the F and timeslots methods would block calls if there were no agreement on a delayed start (epst) value for the call. The non-blocking aspect of the $kT_{wait}$ scheme makes the system unstable at high loads. Therefore, a threshold $T_{max}$ was introduced in simulation in order to block calls if the current time exceeds this value. This scheme is referred to as the $kT_{wait}-T_{max}$ scheme. In this scheme, when a connection request reached the head of the queue (waiting for resources), if the current time was greater than $T_{max}$, then the call was blocked and connection release procedures were initiated.

The simulation compared the four methods, F, timeslots, $kT_{wait}$, and $kT_{wait-Tmax}$, noting that the only the former two exploit knowledge of call holding times. This allows gauging of the value of scheduling calls using knowledge of call holding times. Also, only the $kT_{wait}$ method is purely call queuing; the remaining three are hybrids of call queuing and call blocking.

The following describes the network model used for the simulation and the parameters of the simulation and presents results:

Network Model

Figure 5:
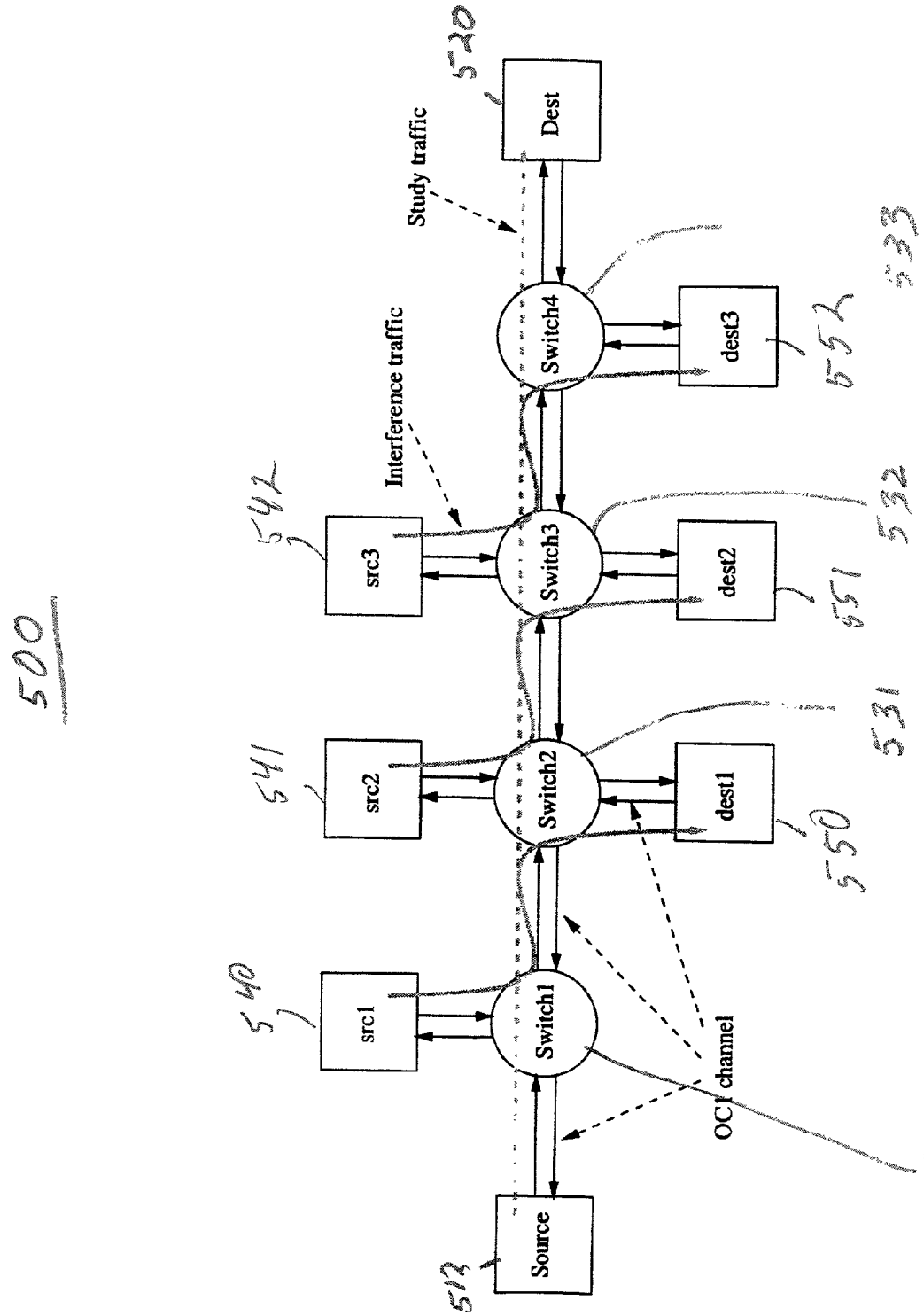
FIG. 5 is a block diagram of a four switch network represented by FIG. 2, FIG. 3 and FIG. 4.

The network model 500 consisted of four switches 530, 531, 532, 533, and the links shown in FIG. 5. The links are unidirectional channels providing one standard rate. In general networks will have much higher channel capacities. Only one bandwidth unit for the interfaces was selected in order to decrease the startup settling time of the simulations. Connections were set up and released between Source 512 and Dest 520, and between srcx 540, 541, 542, and destx 550, 551, 552. The connections between Source 512 and Dest 520 are studied ("study traffic"), and the connections between srcx 540, 541, 542 and destx 550, 551, 552 were created as "interference traffic" to simulate cross traffic. Interarrival times of the connection setup requests and the holding times of the connections were assumed to be exponentially distributed. The destinations were assumed to always accept any connection, allowing concentration on the CAC actions performed by the switches 530, 531, 532, 533.

To simulate the scheduling methods under different load conditions, the mean call interarrival time and mean holding time for the study traffic was kept constant through all the simulations while varying the mean call interarrival time and holding times of the interference traffic. The mean call interarrival time used by Source 512 was 25 seconds and the mean call holding time was 5 seconds, computing to a load of 20% introduced to the network by Source 512.

The mean call interarrival time used for the interference traffic (generated by srcx) 540, 541, 542 was kept constant at 20 seconds while mean holding times were varied from 1 second (5% interference load) to 15 seconds (75% interference load), in increments of 1 second. With these different load conditions, the channels between switches experienced a total load varying from 25% to 95%, while the load on the channel between Switch 4 533 and Dest 520 was kept constant at 20% since there was no interference traffic on this link.

Table II shown in FIG. 6 presents the parameters used for each scheduling scheme, there were no extra parameters for the $kT_{wait}$ method. The parameter $D_{max}$ for the $kT_{wait}$-$T_{max}$ method shown in Table II indicates the maximum delay that was deemed acceptable. In other words, by adding $D_{max}$ to the time when the connection request was sent out by the source, the value of $T_{max}$ was obtained. Each parameter from Table II combined with each combination of mean interarrival time and mean holding time comprised the parameters for one simulation run. For example, one simulation consisted of the scheduling method being timeslots, the number of time slots being 4, with the mean interarrival time of the interference traffic of 20 seconds and the mean holding time of the interference traffic of 9 seconds. Each simulation ran simulated one hour of network activity and was repeated 201 times, each time with a different seed for the random variables.

The results of most interest were the utilization of the channels, the call blocking probability, and the start time delay returned by the network when a request for a connection was made. In the timeslots and F methods, the channels were either free or in use by a connection, while in the two $kT_{wait}$ methods the channels were in one of three states, free, reserved or in use. The second state, i.e. reserved, was used to indicate that the channel had been reserved for a connection but the success reply had not yet been received, which meant the channel was not "in use" (in use to transfer data from the source to the destination). Hence, the utilizations of the channels were measured by computing how much time a channel was "in use" by connections. The F and timeslots methods also had a period in which resources were reserved but not in use, i.e., between sending the setup message and receiving the success reply. However, this time was far smaller (in the order of milliseconds) than the wait time for resources (in the order of seconds), and was hence neglected.

The $kT_{wait}$ method did not block any calls. For all the other methods, the call blocking probability was estimated by computing the ratio between the number of connections requested by Source and the number of connections released by any intermediate switch. The start time delay was the time difference between when Source requested a connection (req) and the value of epst as returned by the network. In the $kT_{wait}$ and $kT_{wait}$-$T_{max}$ schemes, where there was no epst present, the start time delay was the difference between when the connection request was sent and the time when the network replied with success, which is the time the source may start with data transmission.

Figure 7:
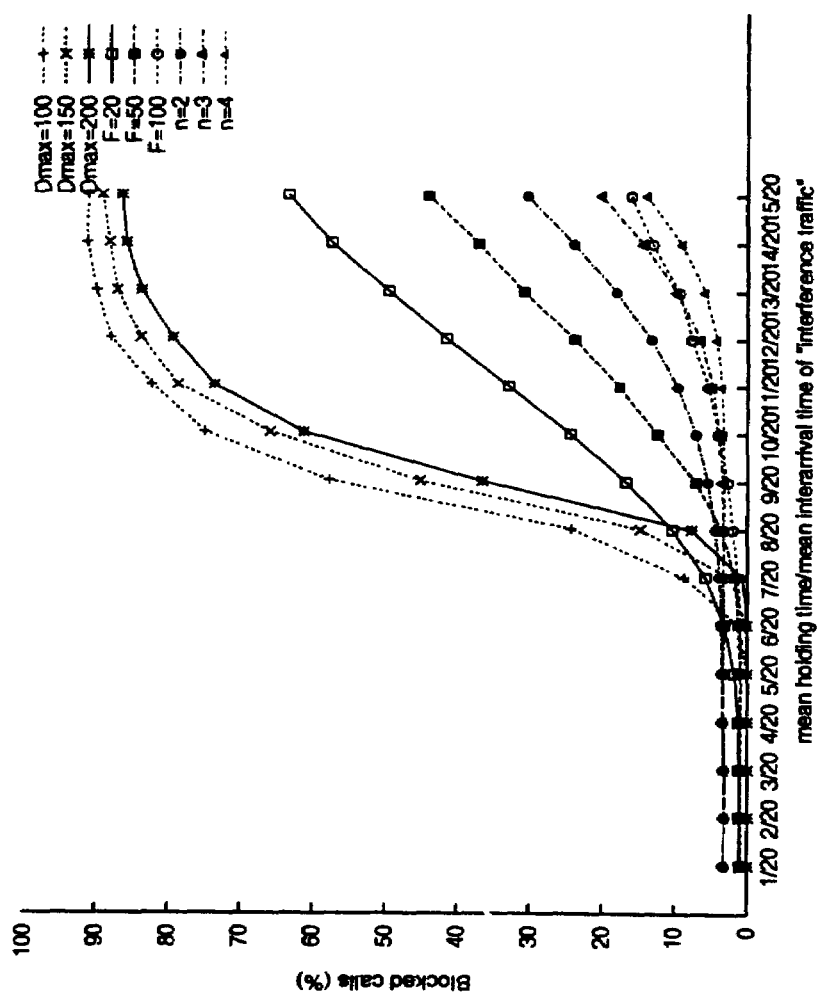
FIG. 7 is a plot of simulation results of percentage of calls blocked using different scheduling schemes.
Figure 8:
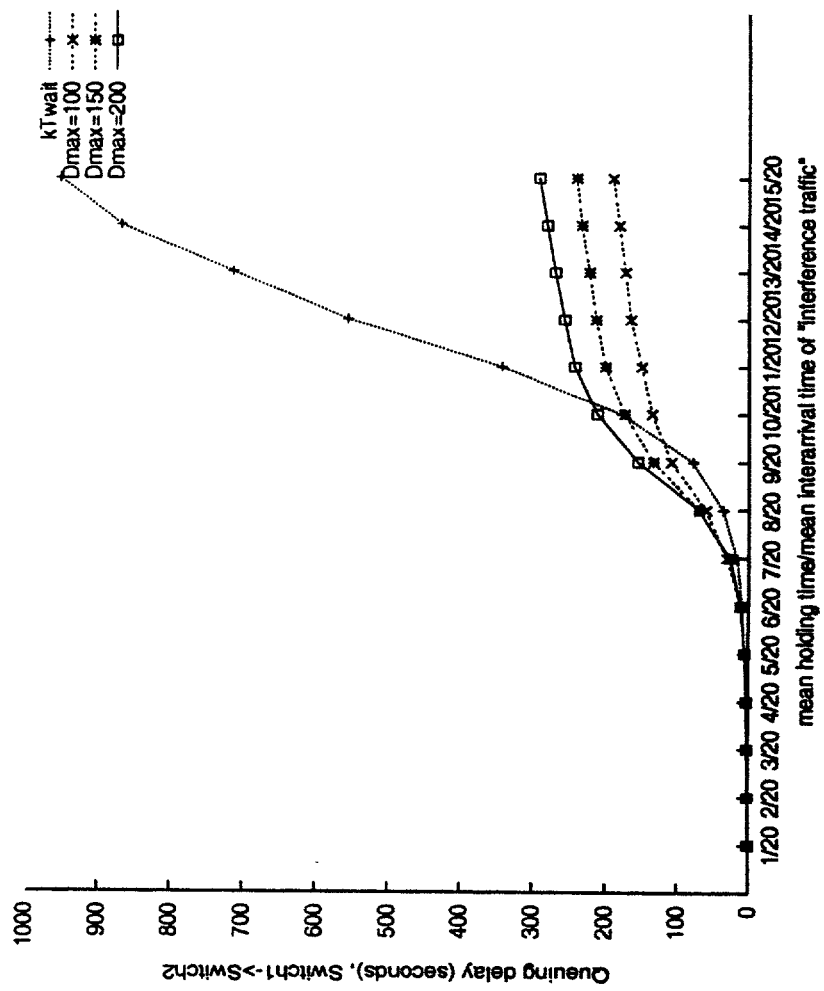
FIG. 8 is a plot of queue delay times experienced by connection requests for connections requiring channel Switch 1 to Switch 2.

FIG. 7 shows the percentage of calls blocked when each scheduling method was used. The $kT_{wait}$-$T_{max}$ scheme performed the worst; even with the usage of a $D_{max}$ value of 200 seconds, the blocking percentage was almost 90%. To explain this high blocking rate, consider the queue at Switch1 in which connection requests requiring access to the channel that connects Switch1 to Switch2 are placed as shown in FIG. 8. With an increase in interference traffic, this queue grows very large and causes connection requests to experience delays larger than $D_{max}$, causing connections to be blocked. Due to the poor performance of the $kT_{wait}$-$T_{max}$ method (as shown in FIG. 8) this method was dismissed from further comparisons.

The call blocking percentages of the F method showed that increasing the value of F decreased the call blocking probability significantly. With the usage of a large F value by Switch1, the chances that a succeeding switch could admit a call during the same time Switch1 was able to admit it increased significantly. Using a small F value (for example 20 seconds) when the average call holding time was large (13 or 15 seconds) proved to increase call blocking.

Increasing the number of time ranges used by the timeslots method decreased blocking probability significantly. Increasing the number of time ranges selected by the ingress switch improved the chances that an intermediate switch would find an overlapping time range during which it had the requested resources available.

Admittedly, the blocking probabilities of the simulation shown in FIG. 7 were rather high. By using much larger numbers of timeslots, and/or adding multiple path searches, the blocking probabilities could be reduced to more acceptable values than the currently shown 12% at 95% utilization for the n=4 timeslots method.

Figure 9:
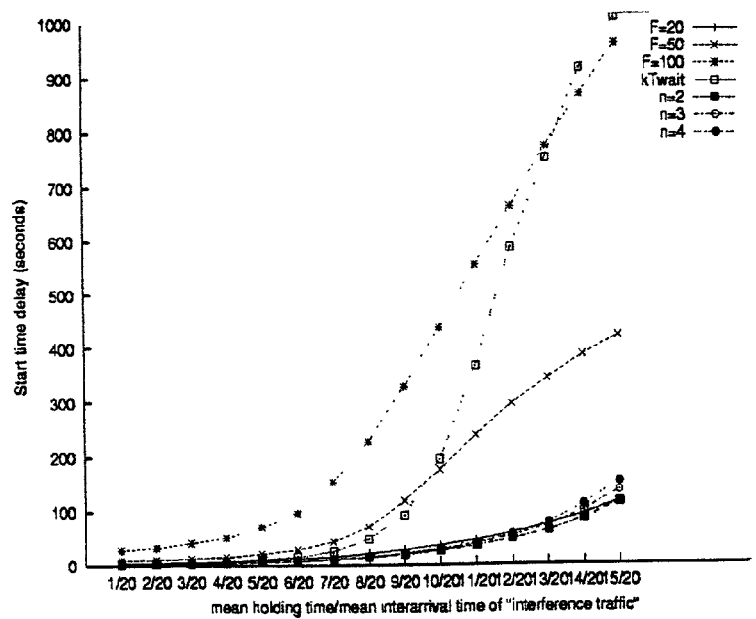
FIG. 9 is a plot of start time delays for different scheduling methods.

The graph presented in FIG. 9 shows the difference in time from when Source requested a connection to Dest and the time when it was allowed to start data transmission for all successful connections. Using a large value for F meant that the host requesting connections might receive later start times than that the network could actually provide, as predicted in the description of the F method in multiswitch networks. Reducing the F value to 50 seconds and 20 seconds respectively reduced the time difference considerably. The timeslots method proved to be the best choice when a connection needed to be admitted as soon as possible. It should be noted that the number of time ranges did not significantly affect the epst difference, this was because when the success reply was returned from the destination, the success reply would always include the epst value as the start time of the earliest time range. The $kT_{wait}$ method's behavior can be explained by looking at FIG. 8, in which when the interference traffic contributes more than 50% to the total load, the queuing delay at Switch1 grows exponentially. Thus, it appears that the $kT_{wait}$ method is not able to handle a total load of more than 70%. Even though the $kT_{wait}$ method did not block connections, the $kT_{wait}$ method became unstable when the load was higher than 70%. A Source may be content to use the timeslots or F method to set up connections, and even if a connection request failed, the sending of a request more than once resulted in less delays in these methods than if the $kT_{wait}$ method were used under high loads.

Figure 10:
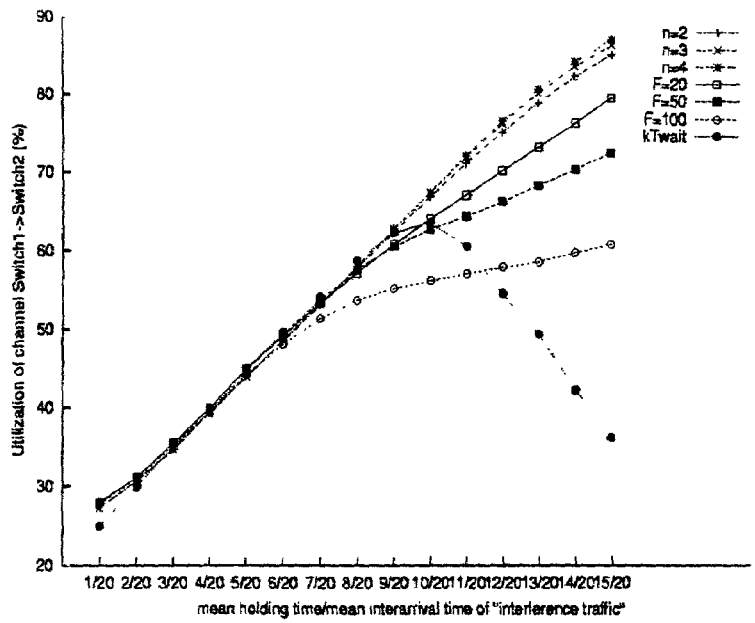
FIG. 10 is a plot of utilization of channel Switch 1 to Switch 2.

FIG. 10 represents the utilization of the OC1 channel between Switch1 and Switch2. The timeslot method performed the best, even when the load of the network was at 95% (20% study traffic and 75% interference traffic), the first channel was utilized close to optimal. As expected, the F method performed poorly when a large value of F was used although it still outperformed the $kT_{wait}$ method. The moment the interference traffic passed the 50% mark, the $kT_{wait}$ method's performance started dropping, the reason for this large drop is as explained above.

Thus, there has been described a scheduling method for calls with known holding times. To support multiple-switch connections, two scheduling alternatives, the F method and timeslots method, have been presented. In the F method, resources are reserved for a long period F, longer than the call holding time, to guarantee that all switches would find a start time for the connection within this long period. In the timeslots method, multiple time ranges when the ingress switch can support the call are selected and sent downstream in the signaling message. Each intermediate switch then selects a subset from within this set, until the destination is reached. These two methods were compared against a simple call queuing scheme, the $kT_{wait}$ method, which does not assume knowledge of call holding times, and a variant of the $kT_{wait}$ method.

The $kT_{wait}$ method became unstable when the traffic load exceeded 70%. At 70% loading, the timeslots method that used knowledge of holding times offered start time delays that were 85% smaller than with the $kT_{wait}$ that does not assume knowledge of call holding times. Also, the timeslots method showed it can be used with traffic loads of 95% meaning a channel utilization increase of 37% is possible using methods that exploit knowledge of call holding times, when compared to the $kT_{wait}$ method at 70% load. The reason the timeslots method is considered better than the F method, is that at large values of F, call blocking is low, but the start time delay is high, and with small values of F, the inverse is true. On the other hand, with the timeslots method, both the call blocking probability and the start time delay are low. The drawback of the timeslots method over the F method lies in the increased signaling overhead, which might be negligible if few time slots are used.

An interesting and novel part of the present invention lies in the invention's introduction of call queuing and providing delayed starts for connections, and culminates in the present invention's use of known call holding times while scheduling to improve both network resource utilization and call queuing delays. Such a method of scheduling calls with known holding times is able to coexist with a traditional call admission control method for calls with unknown holding times by partitioning network resources for calls with known holding times from resources for calls with unknown holding times. Further, the ability of the present invention to schedule end-to-end large file transfers on high-speed circuits, such as SONET and WDM lightpath circuits, without wasting bandwidth is another facet of the invention.

As noted previously, call holding times for file transfers on circuit-switched networks not only includes file emission delay but also propagation delay. Propagation delay depends upon the medium used on the links of the end-to-end path. Direct distances between locations of end hosts and switches cannot be used because, for example, an optical fiber with many coils could be deployed underground as a link, or a satellite link may be used between two points. A slightly pessimistic value of propagation delay can be used so that holding times of connections are larger than actual delays. However, the more accurate the propagation delay, the better the resource utilization. One solution is to include lengths of links and the medium used for links in the routing protocol associated with such networks. If a network has its switch programs set up with this information for the links on the switch's interfaces, then the routing protocol can propagate this information allowing a switch to determine the end-to-end propagation delay for a path. Alternatives based on "test" signals are also a possible alternative.

Additionally, by a file transfer application on circuit-switched networks the present invention could relax the assumption that the end host requesting the circuit specifies a fixed bandwidth requirement and a fixed rate requirement. Given that for a file transfer application, any data rate would be acceptable as long as the end hosts and network are able to support that rate, the end host can just specify a maximum rate at which it can send/receive data, and through the setup procedure, some data rate less than or equal to this maximum rate is determined based on current conditions of the network.

Real Network Considerations

Using the criteria of low call blocking, low start delay, and high utilization, the timeslots method proved to be the superior call scheduling method. A call is considered to have the following five phases of call setup: (i) resource reservation (ii) switch programming (iii) user verification (iv) data transfer, and (v) release. To implement a data call scheduling method, a few practical problems needed to be addressed.

First, a network with multiple switches needs each switch to know its relative clock values in order to interpret the time values indicated in setup request messages. Each switch typically has its own clock, which is not necessarily in synchronization with a global clock or with other switch clocks. Solutions to this problem as provided by NTP (Network Time Protocol) are only accurate within 29 ms on average. This accuracy is insufficient for proper resource reservation because call holding times could be in the order of only a few milliseconds for a network of high-speed circuits. This first real network problem is overcome by providing timestamps in the setup and success messages, which are used to determine the combined values for clock drifts and propagation delays.

Second, as propagation delays become a dominant component of the file transfer delay, resource idle time increases if upstream switches hold the circuit until the last bit of the file reaches the destination, and downstream switches hold the circuit from when the first bit leaves the source. For example, if the data rate of a circuit is 10 Gb/s, and a file of 10 MB is being transferred, then emission delay of the file is only 8 ms, while one-way propagation delay across the USA is approximately 25 ms. This second real network problem is overcome by having resources which are reserved in a staggered fashion at each switch along the path so each switch is held for approximately the holding time of the call as the call propagates along the path.

Third, given that the scheduled start time for a call could be well after it was reserved, there is a possibility that an end host and/or a switch on the path fails to use the reserved resources when the call's start time arrives. Other switches on the path need to detect this situation and immediately release resources to avoid idle time. This third real network problem is overcome by providing a new message called "verify", which is used to have the host verify its intent to use the circuit when the delayed start time arrives.

Fourth, there is a problem which deals with switch programming for both setup and release. Since with the present invention calls are allowed delayed starts, the switch programming task is separated from resource reservation. Should the switch programming action be triggered automatically with timers or by a message then? A similar issue exists for release; since call holding times are known, should call release be triggered by timers or by a message? The present invention prefers a timer-based switch programming and release be used to overcome this fourth real network problem.

Fifth, there is a problem which also occurs during resource reservation. Signaling message traversal delays need to be considered when specifying and selecting time ranges for the call. When the destination switch selects a time range after call setup has progressed all the way through, the destination switch should ensure that there is sufficient time for the reverse success reply message, which carries the selected start time, to reach the source. The problem of how the destination determines the reverse message traversal delay needs to be solved. The method of the present invention has the destination switch verify that the selected time range is sufficient for reverse transversal of the success message to overcome this fifth real network problem.

These solutions are described hereafter within the context of the five phases of call setup: (i) resource reservation (ii) switch programming (iii) user verification (iv) data transfer, and (v) release.

In the resource reservation phase, the ingress switch (switch 1) computes $n_1$ available time ranges, denoted $T^1_1$, and adds these as parameters to the setup request that it sends to the next hop node. The subscript "1" denotes switch 1, while the superscript denotes that the times are expressed in switch 1's clock. Each subsequent switch along the path finds a set of time ranges within this first set of time ranges until a common time range is selected for the call by the destination host. The number of time ranges selected at any switch along the path could be greater than, equal to, or less than $n_1$ based on how the time ranges become splintered or removed. The symbol $n_m$ is used to denote the number of time ranges selected at switch m, where $1 \leq m \leq k$, i.e., for k switches on the path.

Each set of time ranges $T^m_m$ is defined as:

$$T^m_m \equiv [tm^m_{1s}; tm^m_{1e}], [tm^m_{2s}, tm^m_{2e}], \ldots, [tm^m_{n_m s}, tm^m_{n_m e}]$$

where $tm^m_{js}$ is the start time of the jth time range at switch m in switch m's clock and $tm^m_{je}$ is the endtime of the jth time range at switch m in switch m's clock.

Each switch m upon receiving a setup request from the previous switch (m−1) first needs to interpret the time ranges carried in the message into its own switch clock. To accomplish this, time-stamps are used. If a time-stamp $TS^{m-1}$ is placed at switch (m−1) before sending the message to switch m, and another time-stamp $TA^m$ is recorded at switch m as soon as the message arrives, then this difference represents the sum of link emission delay, propagation delay, and the relative clock drift between switch (m−1) and switch m. By adding a detail that the sending switch (m−1) places a time-stamp some time $gt_{m-1}$ before starting transmission of the message, the switch then adds the time value $gt_{m-1}$ to its switch clock time at the time of time-stamping, and place this value in the $TS^{m-1}$ field in the message. Similarly, at the receiving switch m, there may be some time delay gam after message arrival at which point the time-stamp $TA^m$ is placed. Therefore, $$(TA^m - ga_m) - TS^{(m-1)} = p_{(m-1),m} + \frac{L_{setup}}{r} + D_{(m-1),m}$$

where $p_{(m-1);m}$ is the propagation delay on the link between switch (m−1) and switch m, $L_{setup}$ is the setup request message length, r is the data rate used for signaling messages, and $D_{(m-1);m}$ is the clock drift between switch (m−1)'s clock and switch m's clock. Assuming that $ga_m$ is known at switch m, and that the emission delay for the setup request is known, switch m can compute the combined value of propagation delay and clock drift as:

$$p_{(m-1),m} + D_{(m-1),m} = (TA^m - TS^{(m-1)}) - \left(ga_m + \frac{L_{setup}}{r}\right)$$

With this knowledge, the mth switch can convert the received time ranges to its clock by using the following relationship.

$$T^m_{(m-1)} = T^{(m-1)}_{(m-1)} + (p_{(m-1),m} + D_{(m-1),m})$$

$T^m_{(m-1)}$ is the set of time ranges selected at switch (m−1) expressed in switch m's clock. From within this set, switch m then selects another set $T^m_m$ of $n_m$ time ranges such that $$tm^m_{je} - tm^m_{js} \geq \frac{f}{r_{min}} + \tau_m + 2\epsilon$$

An assumption made here is that the user data traverses the same link as the signaling message. In other words non-facility associated signaling cannot be used in this implementation. The quantity™ is some small time cushion to allow for any small miscomputations of propagation delay. Also, each time range should be large enough to transmit the whole file through the switch, i.e.

$$[tm^m_{js}, tm^m_{je}] \subseteq [t(m-1)^m_{qs} - \epsilon, t(m-1)^m_{qe} + \epsilon]$$

where $1 \leq j \leq n_m$ and $1 \leq q \leq n_{(m-1)}$.

where f is the file size, $r_{min}$ the minimum rate for the circuit (as will be explained later), $\tau_m$ is the propagation delay through switch m. The start and ending times of these time ranges are when the actual data transfer can start and/or end, respectively. However resources at the switch need to be reserved to include the times to program the switch fabric before and after the transfer. Thus if $\rho_m$ is the switch programming time for switch m, resources must be reserved at switch m for the time ranges $R_m$ given by $$R_m = [(tm^m_{js} - \rho_m), (tm^m_{je} + \rho_m)] \quad \forall j, 1 \leq j \leq n_m$$

The call setup progresses from switch to switch, with each switch performing the time range conversion to its own clock, its own selection of time ranges, and reservation of resources for selected time ranges. When the setup request reaches the destination, it needs to select a particular time slot for the circuit after taking into consideration its own resource availability. The destination is denoted as the (k+1)th node since it was assumed that there were k switches on the path. Besides finding a time range that satisfies the constraints of the previous three relationships, the destination needs to perform an additional task to solve the fifth problem described previously. The destination should select a start time for the call such that the source will not receive the success reply after the connection's scheduled start time. Thus, $$epst_0^{(k+1)} \geq t_{current}^{(k+1)} + d_r$$

where $d_r$ is the time taken for the reverse success reply message to travel hop-by-hop from the destination to the source. The time $epst^{(k+1)}{}_0$ is the start time that should be given to the source (node 0), with this time being expressed in the destination's clock. While the inequality immediately above needs to hold, the destination determines $epst^{(k+1)}{}_{(k+1)}$ as follows:

$$epst_{(k+1)}^{(k+1)} = epst_0^{(k+1)} + \sum_{m=0}^{k} p_{m,(m+1)}$$

$$epst_{(k+1)}^{(k+1)} \geq t_{current}^{(k+1)} + d_r + \sum_{m=0}^{k} p_{m,(m+1)}$$

This means the destination needs to know dr as well as the cumulative propagation delay on the end-to-end path. To determine these two parameters, an end-to-end time-stamping mechanism is used, i.e., that the source places an end-to-end timestamp $ETS^0{}_0$ that is carried without change from switch to switch. When the setup request is received at the destination, it notes the time as $ETS^{(k+1)}{}_{(k+1)}$ and uses the difference in the equations immediately following to obtain the required parameters.

$$ETS_{(k+1)}^{(k+1)} - ETS_0^0 = d_f + D_{0,(k+1)}$$

$$ETS_{(k+1)}^{(k+1)} = ETS_0^0 + d_f + \sum_{m=0}^{k} D_{m,(m+1)}$$

Since setup request message processing times ($d_f$) are longer that success reply message processing times, i.e., $d_r \leq d_f$, $d_f$ can be used as an estimate for $d_r$. By using $d_f$, the fact that the success reply message reaches the source before the selected start time arrives is ensured.

Therefore, $epst^{(k+1)}{}_{(k+1)}$ is chosen such that:

$$epst_{(k+1)}^{(k+1)} \geq t_{current}^{(k+1)} + d_f + \sum_{m=0}^{k} p_{m,(m+1)}$$

$$epst_{(k+1)}^{(k+1)} \geq t_{current}^{(k+1)} + ETS_{(k+1)}^{(k+1)} - ETS_0^0 - \sum_{m=0}^{k} D_{m,(m+1)} + \sum_{m=0}^{k} p_{m,(m+1)}$$

To compute the right hand side of the inequality immediately above, the cumulative propagation delay and the cumulative clock drift are needed. The former can be obtained by having each switch use an independent mechanism to determine propagation delays for each of its interfaces, and passing this information hop-by-hop in the forward signaling message. An example mechanism to determine link propagation delays is to have each switch send a hardware-processed message at initialization time on all its interfaces, receiving replies and noting the round-trip time difference.

To obtain the cumulative clock drift, it can be noted that each switch computes the sum of link propagation delay and clock drift, $p_{(m-1);m} + D_{(m-1);m}$ described previously, in the forward direction. If this is accumulated hop-by-hop, the destination will know the total cumulative propagation delay plus clock drift. Given than the destination can determine the total propagation delay component alone using the mechanism described above, the destination can then determine the cumulative clock drift. Using these two values, the destination has all the information for the right-hand side of the inequality above. After using the set theory relationship presented above to find time ranges during which it can accommodate the connection at the agreed upon rate, r (the agreement between switches upon a rate for the connection will be discussed later), the destination then simply finds the earliest time range $epst^{(k+1)}{}_{(k+1)}$ such that it satisfies the immediately previous inequality and $$\left[ epst_{(k+1)}^{(k+1)}, epst_{(k+1)}^{(k+1)} + \frac{f}{r} + \tau_m + \epsilon \right] \subseteq [t(k+1)_{js}^{(k+1)}, t(k+1)_{je}^{(k+1)}]$$

for some $j$, $1 \leq j \leq n_{(k+1)}$

Once the destination selects its start time for the call, $epst^{(k+1)}{}_{(k+1)}$, the destination determines the corresponding start time at switch k using (22) and includes it in the success reply.

$$epst_k^k = epst_{(k+1)}^{(k+1)} - (p_{k,(k+1)} + D_{k,(k+1)}) + \epsilon$$

Similarly, each switch m upon receiving a success reply from the next (downstream) switch (m+1) carrying an $epst^m{}_m$, determines the epst for the next (upstream) switch (m−1) as follows:

$$epst_{(m-1)}^{(m-1)} = epst_m^m - (p_{(m-1),m} + D_{(m-1),m}) + \epsilon$$

Each switch releases resources reserved for all time ranges other than the selected time range, which is now $$\left[ epst_m^m - \rho_m, epst_m^m + \frac{f}{\tau}\tau_m + \epsilon + \rho_m \right].$$

It also sets a timer to initiate switch programming at $epst_m^m - \rho_m$. To remove variabilities associated with message-based switch programming, a decision was made to use timer-based switch programming. A second timer is also set to initiate release at $$epst_m^m + \frac{f}{\tau} + \epsilon + \tau_m.$$

Figure 11:
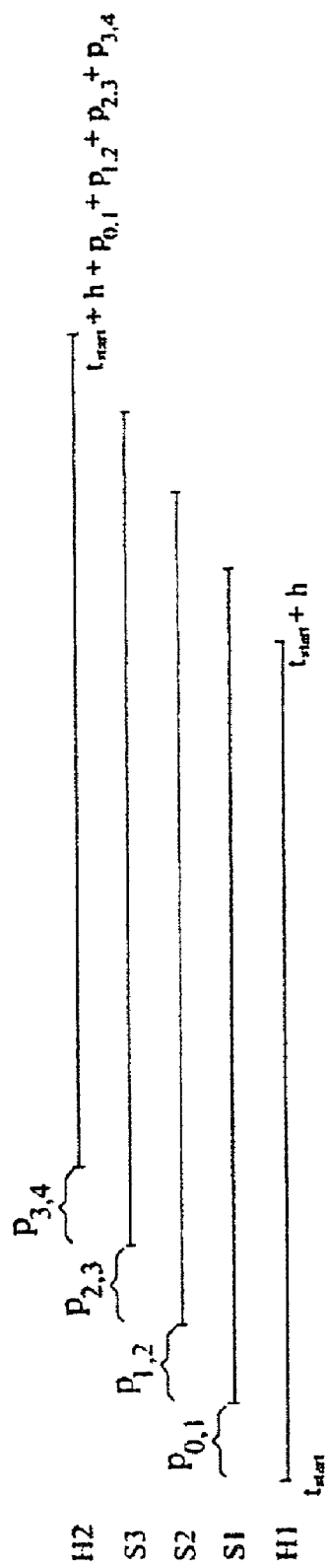
FIG. 11 is an illustration of a connection duration using propagation delay considerations to reduce resource idle time.

Through this process, the source receives a success reply with a start time $epst^0{}_0$. When the start time arrives at the source, it starts sending data. As switch programming timers expire at each switch of the switches, the circuit will be set up in a staggered fashion as shown in FIG. 11. After data passed through a switch, the release timer will expire and the circuit resources will be released.

To handle the third real network problem described above, the present invention has the source send a verify message when the source commences sending data. The verify message indicates to all the switches in the connection that the source is in fact using the requested connection. A switch can thus release the reserved resources if it does not receive a verify message during a certain time after switch programming was completed. If the connection holding time is so short that the data has finished flowing through the switch before the verify message arrives, the message is simply discarded. If not, when the verify timer expires, it can release the resources. Thus, three timers are needed for each connection, the switch programming timer, the release timer and the verify timer.

A final issue to note is the reason for the use of $r_{min}$ in the tm relation above for the forward direction, and r in the epst relation above for the reverse direction. For certain transfers, the user may wish to specify a given rate and either receive it or not. On the other hand, for other data transfers, such as file transfers, the end host can request a range of data rates $[r_{min}, r_{max}]$ but have the network reserve and provide the host any value available within this range.

The present invention allows for this latter case. As a connection request progresses through the network, each switch attempts to accommodate the connection at the maximum rate in this range. However, time range reservations are made using $r_{min}$ because the holding time will be longest for this minimum rate. When call setup finally reaches the destination, the rate r is selected for the circuit. In the reverse direction, the final holding time is recomputed using the agreed upon rate r, where $r \in [r_{min}, r_{max}]$. This recomputation will reduce the holding time for which resources have been reserved in the forward direction if $r > r_{min}$.

Thus, through the use of time stamps, propagation delay measurements, and verify messages, the clock drift, message traversal delays, and other problems related to implementing the timeslots call scheduling method for a network with plural switches are solved by the present invention.

Although this invention has been described with respect to a preferred embodiment, those skilled in the art may devise numerous other arrangements. For example such a method could coexist with a traditional call admission control method for calls with unknown holding times by partitioning network resources for calls with known holding times from resources for calls with unknown holding times. Another way calls with known holding times can coexist with calls with unknown holding times is for the same inventive methods to be used on both, but for call with unknown holding times, a holding time of infinity is assumed. The appended claims are meant to cover all such arrangements that do not depart from the scope of the invention.

What is claimed is:

1. A method for making a data call from a host to a destination over a network, comprising the steps of:

determining a period of time required to transmit a user's stored data file of predetermined size from the host using the data call over the network;

sending a setup message including a holding time of said data call from the host to a switch connected to said network, where the holding time is the period of time needed to transfer the data file using the data call over the network, the holding time determined prior to the sending of the setup message;

responsive to said setup message, determining at said switch if a channel is available from a plurality of channels and when said channel is available for making said data call from said host to said destination;

responsive to said channel being available, said switch sending a success message to said host identifying said available channel and a start time for making said data call, the start time being a time at which the transfer of data file will begin;

sending another setup message including the available channel and the available time to a terminating switch connected to said destination;

determining from said another setup message and local information at said terminating switch if a channel is available through said terminating switch and what times are available to make said data call; and if a channel is available for said holding time of said data call through said switch and said terminating switch, sending a success message identifying the available channel and the available time to make said data call, where the available time is a time at which the transfer of the data file will begin.

2. The method of claim 1 wherein said holding time is equivalent to a time to transfer said data file at a first rate.

3. The method of claim 1 wherein said holding time of said data call is a predetermined time interval required for information to be communicated during the data call to be received by the destination from the host.

4. The method of claim 2 wherein said network said data call is made over includes one of SONET and Internet Protocol sub-networks.

5. The method of claim 2 wherein said network said data call is made over includes a virtual circuit ATM portion.

6. A method for making a data call having a hold time from a host to a destination over a network having a plurality of switches, comprising the steps of:

determining a predetermined time duration of the holding time where the predetermined time duration is an amount of time required for a predetermined amount of information to be communicated during the data call to be received by the destination from the host;

sending, following the predetermined time duration having been determined, a setup message from the host to a first switch of said plurality of switches of said network requesting a channel to said destination for a data call having said holding time;

determining from said setup message and local information at said first switch if a channel of a plurality of channels is available through said fist switch to a subsequent switch of said plurality of switches and what times each available channel is available to make said data call;

sending a subsequent setup message including the available channels and the available times for said channels for said data call to a subsequent switch of said plurality of switches;

determining from said subsequent setup message and local information at said subsequent switch if a channel of a plurality of channels is available through said first switch and said subsequent switch and what times each available channel is available to make said data call;

sending another setup message including the available channels and the available times for said channels for said data call of said first and subsequent switches to a terminating switch of said plurality of switches that is connected to said destination;

determining from said another setup message and local information at said terminating switch if a channel of a plurality of channels is available through said first and subsequent switches and what times each available channel is available to make said data call; and if a channel is available for said holding time of said data call through all switches between host and destination, sending a success message identifying the available channel and the available time to make said data call, where the available time is a time at which the transfer of the data file will begin.

7. The method of claim 6, wherein in response to said success message each switch along the available channel reserves the channel and the time for said data call as determined by said terminating switch.

8. The method of claim 7, wherein said time for said data call was the earliest possible starting time for a successful data call having said holding time from host to destination.

9. The method of claim 7, wherein said host makes said data call on the channel upon the occurrence of the available time.

10. The method of claim 9, wherein said time for said data call was the earliest possible starting time for a successful data call from host to destination.

11. The method of claim 6, wherein said time for said data call was the earliest possible starting time for a successful data call from host to destination.

12. The method of claim 6, wherein said determining steps were made using an F method.

13. The method of claim 6, wherein said determining steps were made using a timeslots method.

14. The method of claim 6, wherein said determining steps were made using a $kT_{wait}$ method.

15. The method of claim 6 wherein the subsequent switch and the terminating switch are the same switch.

16. An apparatus for completing a data call with a holding time from a host to a destination over a network having a plurality of switches, comprising:

a first switch of said plurality of switches connected to said host and having means for receiving a setup message from said host for setting up a channel to said destination for a data call having said holding time where the holding time is a predetermined time duration being an amount of time required for a predetermined amount of information to be communicated to the destination from the host;

said first switch having means for determining from said setup message and local information of said first switch if a channel of a plurality of channels is available through said first switch to a subsequent switch of said plurality of switches and at what future times each available channel is available to make said data call in response to receiving said setup message;

said first switch also having means for sending a subsequent setup message including the available channels and the available times for said channels for said data call to a subsequent switch of said plurality of switches between said host and said destination;

said subsequent switch having means for determining from said subsequent setup message and local information of said subsequent switch if a channel of a plurality of channels is available through said first switch and said subsequent switch and what times each available channel is available to make said data call;

said subsequent switch also having means for sending another setup message including the available channels and the available times for said channels for said data call of said first and subsequent switches to a terminating switch of said plurality of switches that is connected to said destination responsive to said subsequent switch determining means;

said terminating switch having means for determining from said another setup message and local information of said terminating switch if a channel of a plurality of channels is available through said first and subsequent switches and what times each available channel is available to make said data call to said destination; and if a channel is available for said data call for the holding time thereof through the switches between said host and said destination, said terminating switch having means for sending a success message identifying the channel and the time when said channel is available to make said data call to said host, where the time when said channel is available is a time at which the transfer of the data file will begin.

17. The apparatus of claim 16 wherein the subsequent switch and the terminating switch are the same switch.

18. The apparatus of claim 16, wherein said setup message includes said holding time at a first data first rate.

19. The apparatus of claim 18 wherein said channel availability determining includes using said file transfer time at said first rate.

* * * * *